Feb. 20, 1968     D. R. SCOTT ETAL     3,369,417
PNEUMATIC SPEED CONTROL MEANS AND METHOD
Filed Feb. 23, 1965     4 Sheets-Sheet 1
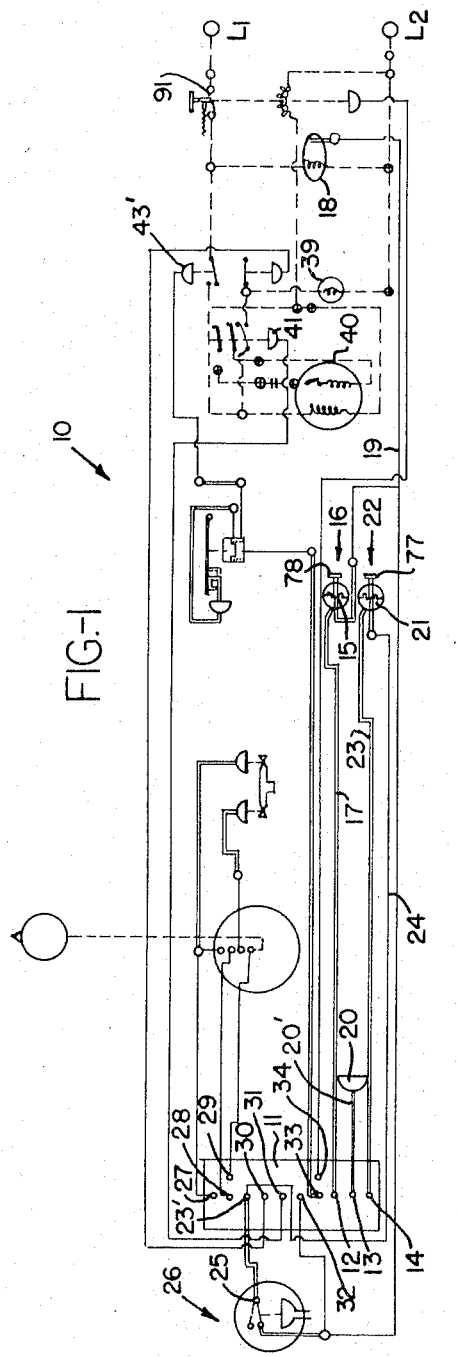
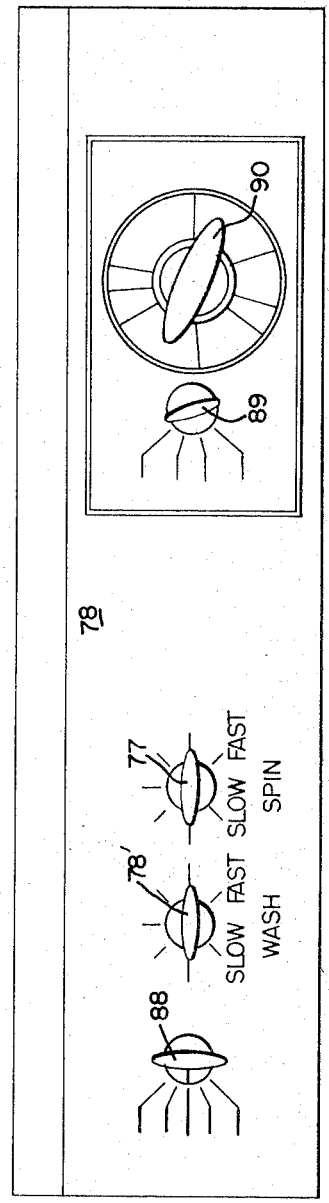
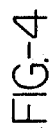
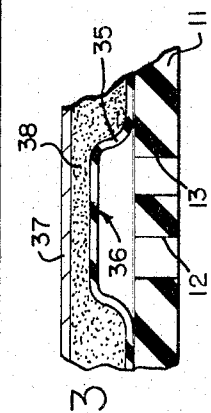
INVENTORS
DOUGLAS R. SCOTT
ROY W. HOUSER
BY *Cauden & Cauden*
THEIR ATTORNEYS

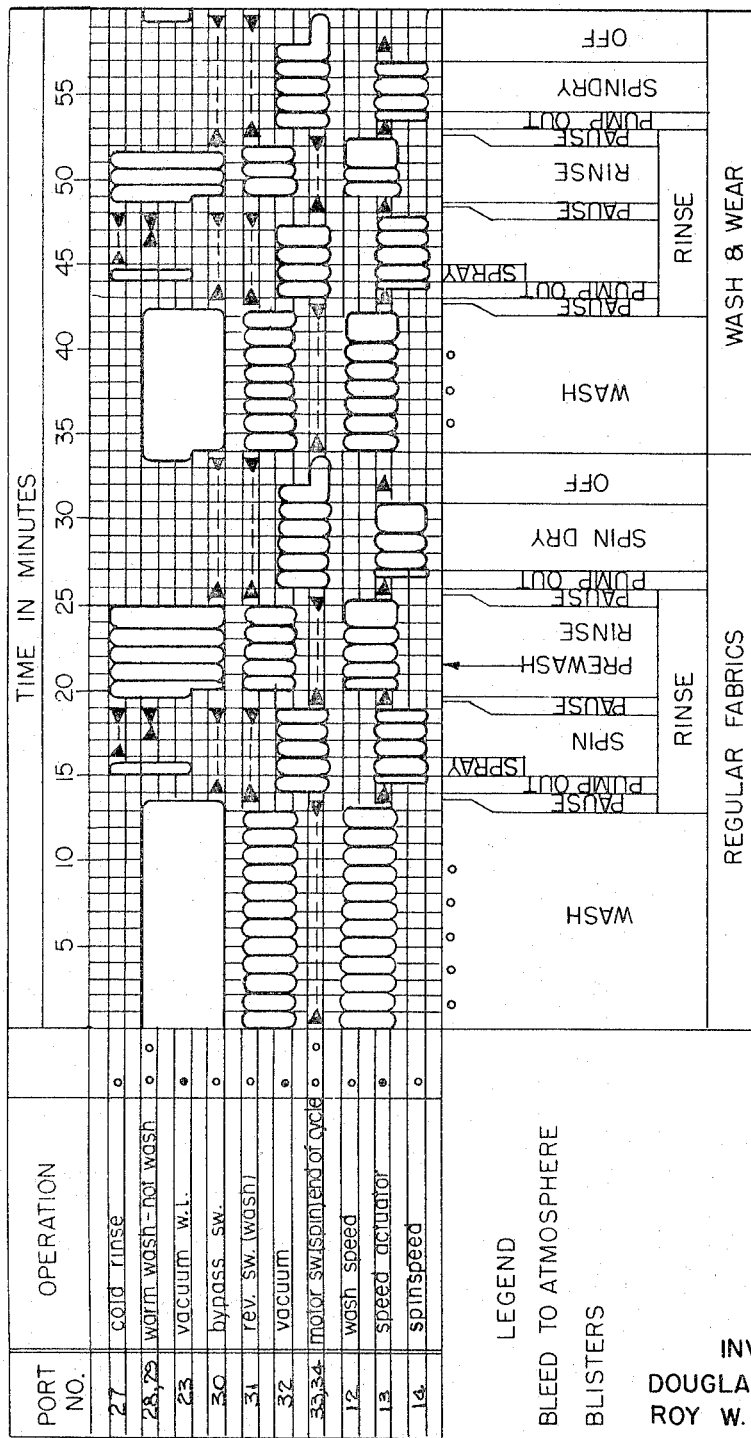

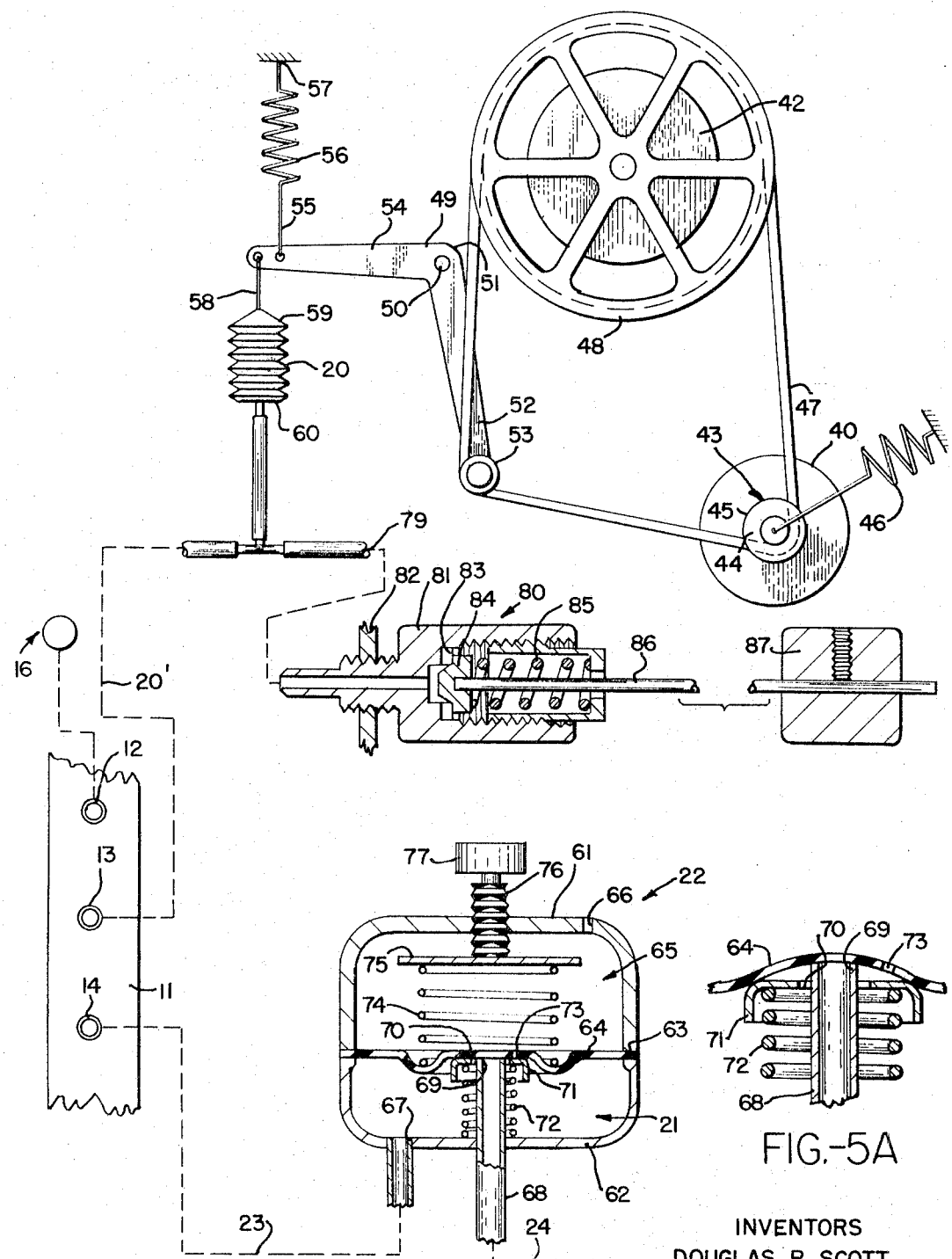

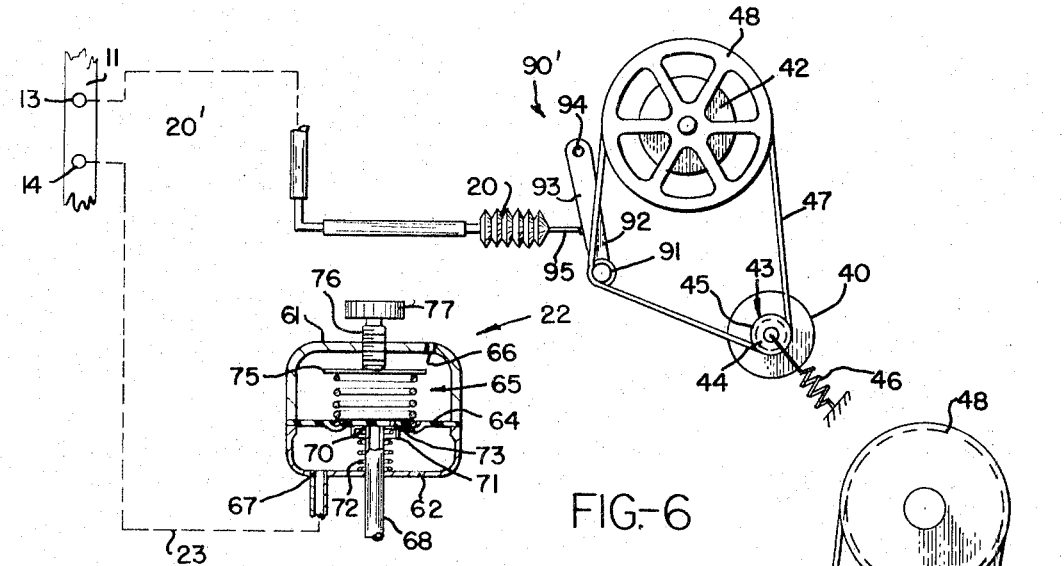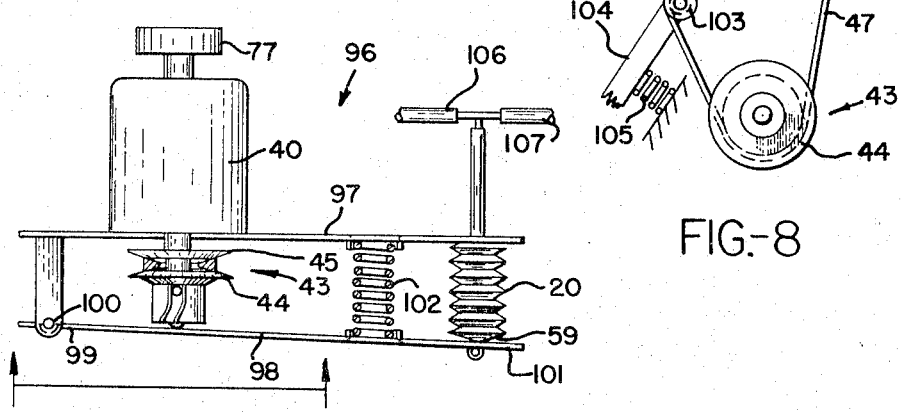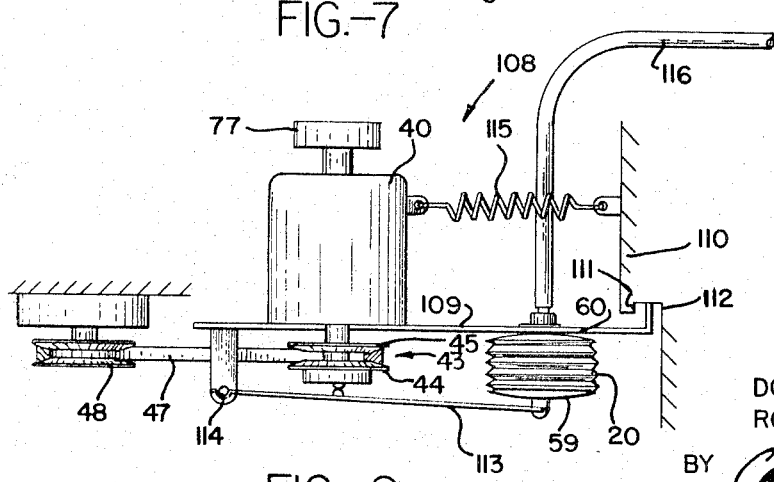

United States Patent Office 3,369,417
Patented Feb. 20, 1968

3,369,417
PNEUMATIC SPEED CONTROL MEANS AND METHOD
Douglas R. Scott, Santa Ana, and Roy W. Houser, Orange, Calif., assignors to Robertshaw Controls Company, Richmond Va., a corporation of Delaware
Filed Feb. 23, 1965, Ser. No. 434,476
11 Claims. (Cl. 74—230.17)

ABSTRACT OF THE DISCLOSURE

This disclosure relates to a washing apparatus or the like that has the cycle of operation thereof automatically controlled by a timer movable program member that interconnects and disconnects a vacuum source to and from various pneumatically operated actuator means to control the operation of the apparatus, one of the actuator means controlling the position of a movable sheave relative to a fixed sheave of a motor driven pulley arrangement to vary the speed of spin and/or movement of a movable part of the washing machine in relation to the magnitude of the vacuum signal directed to such actuator means with such magnitude of signal being preselected by a separate selector means of the control system.

---

This invention relates to an improved pneumatic control means for controlling the speed of variable speed means as well as to an improved method of operation thereof.

For example, this invention is adaptable to control the agitation speed and/or centrifuging speed of a domestic washing machine or the like so that the operator can select the desired speed for the movement of the agitator and/or washing compartment thereof.

In particular, this invention provides a variable pitch drive pulley interconnected to the washing machine transmission means by a belt means in such a manner that when the motor is driven in one direction, the transmission means will operate the agitator for the washing machine and when the motor is driven in the other direction, the transmission means will spin the washing compartment thereof. Pneumatically operated actuator means are so provided that the same are adapted to change the tension on the belt means when a pneumatic signal is directed to the actuator means so as to vary the pitch of the drive pulley and, thus, vary the speed of the washing machine transmission means whereby the operator can select the desired speed of agitation and/or speed of spin of the washing compartment.

Accordingly, it is an object of this invention to provide an improved variable speed means.

Another object of this invention is to provide an improved method of controlling a variable speed means.

Other objects, uses and advantages of this invention are apparent from a reading of this description which proceeds with reference to the accompanying drawings forming a part thereof and wherein:

FIGURE 1 is a schematic view illustrating the pneumatically controlled washing machine or the like.

FIGURE 2 is a schematic diagram illustrating the operation of the washing machine of FIGURE 1.

FIGURE 3 is an enlarged, fragmentary, cross-sectional view illustrating how a program member is adapted to interconnect a vacuum source to a pneumatic actuator.

FIGURE 4 is a schematic front view of a control panel of the washing machine of FIGURE 1.

FIGURE 5 is an enlarged, fragmentary, schematic view illustrating one embodiment of this invention.

FIGURE 5A is an enlarged, fragmentary, cross-sectional view of a part of the vacuum regulator illustrated in FIGURE 5.

FIGURE 6 is a view similar to FIGURE 5 and illustrates another embodiment of this invention.

FIGURE 7 is a view similar to FIGURE 5 and illustrates still another embodiment of this invention.

FIGURE 8 is a fragmentary, cross-sectional view taken on line 8—8 of FIGURE 7.

FIGURE 9 is a view similar to FIGURE 7 and illustrates another embodiment of this invention.

While the various features of this invention are hereinafter described and illustrated as being particularly adaptable for providing pneumatically operated variable speed means for a domestic washing machine or the like, it is to be understood that the various features of this invention can be utilized singly or in any combination thereof to provide control means for other devices as desired.

Therefore, this invention is not to be limited to only the embodiments illustrated in the drawings, because the drawings are merely utilized to illustrate one of the wide variety of uses of this invention.

Referring now to FIGURE 1, an improved control system of this invention is generally indicated by the reference numeral 10 and is utilized to control the operation of a domestic washing machine or the like.

In particular, the system 10 illustrated in FIGURE 1 includes a reading head 11 having a plurality of ports formed therein, such as ports 12, 13 and 14.

The port 12 is interconnected to a vacuum control chamber 15 of a vacuum regulator 16 by a flexible conduit means 17, the vacuum chamber 15 also being adapted to be interconnected to the inlet of a vacuum pump 18 by a flexible conduit means 19.

The port 13 in the reading head 11 is adapted to be interconnected by a flexible conduit means 20' to a pneumatic actuator 20 later to be described.

The port 14 in the reading head 11 is adapted to be interconnected to the control chamber 21 of another vacuum regulator 22 by a flexible conduit means 23, the chamber 21 of the vacuum regulator 22 adapted to be interconnected to a port 23' of the reading head 11 by a flexible conduit means 24.

The port 23' in the reading head 11 is also interconnected to a port 25 of a water level control 26 which will interconnect the vacuum line 19 to the port 25 when the water level in the washing machine has fallen below a desired level. Thus, when the water in the washing machine has fallen below the desired level, the vacuum source 18 is adapted to be interconnected to the chamber 21 of the regulator 22 by means of the water level control 26 so that the regulator 22 can be utilized to control the spin speed of the washing compartment of the washing machine in a manner hereafter described.

The vacuum regulator 16 is adapted to control the wash speed of the agitator in the washing compartment of the washing machine in a manner hereinafter described.

The other ports 27, 28, 29, 30, 31, 32, 33 and 34 are respectively interconnected to other actuators of the system 10 or to the vacuum source 18 in the manner illustrated in FIGURE 1 to cause the system 10 to operate in a sequential manner as fully illustrated in the diagram illustrated in FIGURE 2.

As illustrated in FIGURE 3, the reading head 11 has a reading sheet 35 adapted to move over the same, the reading sheet 35 being flexible and having a plurality of open ended channels or indentations 36 formed therein adapted to bridge two or more ports in the reading head 11, such as ports 12 and 13 in the manner illustrated in FIGURE 3. Thus, as the channels 35 bridge the ports 12 and 13, it can be seen that the vacuum in the control chamber 15 of the vacuum regulator 16 is adapted to be interconnected to the pneumatic actuator 20 to actuate the same in a manner hereinafer described.

The reading sheet 35 is carried by a rigid backing member 37 and is separated therefrom by a porous resilient material 38, the backing member 37 being rotated relative to the reading head 11 by a suitable timer motor 39, FIGURE 1, to provide sequential control of the system 10 in the manner illustrated in FIGURE 2. The reading sheet 35 also has a plurality of apertures passing therethrough in a desired pattern so that when the same are aligned with particular ports in the reading surface 11, atmosphere is adapted to return to the particular actuator by passing through a suitable aperture means in the backing member 37 and be filtered by the porous resilient material 38 before the same is directed to the particular actuator to permit the same to return to atmospheric conditions in the manner illustrated in FIGURE 2.

Thus, it can be seen that the program sheet 35 controls the operation of the system 10 in the manner illustrated in FIGURE 2 whereby the particular details of the system 10 will not be described as this invention pertains to the operation of the variable speed means for driving the agitator and/or spinning compartment in a manner now to be described.

As illustrated in FIGURE 5, an electric motor 40 is provided and is illustrated schematically in FIGURE 1, the electric motor 40 being adapted to be driven in one direction when an actuator 41 is actuated to cause transmission means 42 to operate the agitator of the washing machine. When an actuator 43' is actuated, the same causes the output shaft of the motor 40 to rotate in the opposite direction and cause the transmission means 42 to spin the washing compartment of the washing machine.

In particular, the output shaft of the motor 40 carries a drive pulley 43 having a variable pitch movable sheave 44 normally urged towards a mating sheave 45 by spring means 46 to tend to increase its pitch and hold a belt means 47 at the outer periphery thereof to drive the belt means 47 at maximum speed.

The belt means 47 passes around a driven pulley 48 which is adapted to drive the transmission means 42 previously described.

However, an L-shaped lever 49 is provided and is pivotally mounted to the frame means of the washing machine by a pivot pin 50 at the elbow 51 of the lever 49. One arm 52 of the lever 49 carries an idler roller 53 on the end thereof and around which the belt means 47 passes.

The other arm 54 of the lever 49 is interconnected to one end 55 of a tension spring 56 having the other end 57 thereof secured to the frame means of the washing machine.

Thus, the force of the tension spring 56 tending to move the lever 49 in a clockwise direction is greater than the force of the spring 46 and, thus, through the idler roller 53 applies tension on the belt means 47 in such a manner that the same tends to separate the sheaves 44 and 45 so that the belt means 47 decreases the pitch of the drive pulley 43 whereby the drive pulley 43 will normally drive the driven pulley 48 at a minimum speed.

However, the actuator 20 previously described is interconnected to the end of the arm 54 by interconnecting means 58 so that when a vacuum signal is directed to the actuator 20, the same has the movable wall 59 thereof moved toward the fixed wall 60 thereof in a manner to cause counterclockwise rotation of the lever 49 about its pivot point 50 so that the idler roller 53 is moved to the right in opposition to the force of the compression spring 56 and permits the sheave 44 to be moved toward the sheave 45 by the force of the compression spring 46 and thereby increase the pitch of the pulley 43 so that the belt means 47 will ride on the outer periphery thereof and, thus, drive the driven pulley 48 at a higher speed.

However, by controlling the magnitude of the vacuum signal directed to the actuator 20, the lever 49 can be positioned anywhere between its inner and outer positions for controlling the speed of the driven pulley 48 by controlling the pitch of the drive pulley 43 in a manner hereinafter described.

In particular, since the vacuum regulators 16 and 22 are identical, only the regulator 22 is fully illustrated in FIGURES 5 and 5A and the details thereof are the same as the regulator 16.

In particular, the regulator 22 comprises a pair of cup-shaped housings 61 and 62 secured together in any suitable manner and sandwiching an outer periphery 63 of a flexible diaphragm 64 therebetween, the diaphragm 64 dividing the housing means 61, 62 into two chambers 21 and 65 in the manner illustrated in FIGURE 5. The chamber 65 is interconnected to the atmosphere by an aperture means 66 in the housing member 61 while the chamber 21 is adapted to be interconnected to the port 14 of the reading head 11 by the conduit means 23 being interconnected to a nipple 67 in communication with the chamber 21.

The conduit 24 is interconnected to a tubular member 68 projecting into the chamber 21 and having an open end 69.

The end 69 of the tubular member 68 is adapted to be sealed closed by the diaphragm 64 in the manner illustrated in FIGURE 5 and projects through an enlarged opening 70 in a vent hole closing member 71 normally urged into sealing contact with the diaphragm 64 by a compression spring 72.

The diaphragm 64 has an offset aperture 73 passing therethrough and normally sealed closed by the closing member 71 in the manner illustrated in FIGURE 5.

A compression spring 74 is disposed between the diaphragm 64 and a plate 75 having the position thereof adjusted by an adjusting screw 76 manually rotated by a selector knob 77.

The selector knob 77 of the vacuum regulator 22 is mounted for access on a control panel 78 of the washing machine in the manner illustrated in FIGURE 4 while a control knob 78' for the regulator 16 is mounted adjacent thereto to be manually adjusted in the same manner as the control knob 77.

While the port 13 and the reading head 11 is interconnected to the bellows 20 by the conduit means 20', the interior of the bellows 20 is also interconnected to a branch conduit 79 leading to an unbalance control valve 80.

The unbalance control valve 80 comprises a housing 81 mounted to a frame means 82 of the washing machine so as to be subject to vibrations on the frame means 82 during the spinning operation of the washing compartment of the washing machine.

The interior of the housing 81 is interconnected to the conduit 79 and has a valve seat 83 normally closed by a valve member 84 under the force of a compression spring 85. However, the valve member 84 is interconnected to an elongated stem 86 having a weight 87 on the end thereof whereby when vibrations are set up in the frame means 82 by the washing compartment spinning in an unbalanced condition, the vibration of the weight means 87 causes the valve member 84 to open and close relative to the seat 83 so that atmosphere can enter the open valve seat 83 and be directed to interior of the bellows 20 to deactuate the same in a manner hereinafter described.

The operation of the control system 10 as it applies to the features of this invention will now be described.

Before the operator turns on the system 10, the operator adjusts the control knob 78′ to select the desired wash speed and adjusts the knob 77 to select the desired spin speed for the particular load of clothes to be washed by the washing machine 10 of this invention.

Of course, the water level for the particular washing cycle can be selected by a control knob 88 and the temperature of the water can be selected by a control knob 89.

Thereafter, the operator adjusts the main control knob 90 to select the particular washing program for the system 10.

Thereafter, the operator pulls out on the control knob 90 to close an electrical switch 91 to place the pump 18 and motors 39 and 40 across the power leads $L_1$ and $L_2$ whereby the timer motor 39 drives the program means 35, 37 and 38 relative to the reading sheet 11 to operate the system 10 by means of the blisters 36 and aperture means of the reading sheet 35 in the manner previously described.

Since the blister means 36 are bridging the ports 12 and 13 during the wash cycle as illustrated in FIGURE 2 and the blister means 36 are bridging the ports 31 and 32, the motor 40 is operated to cause operation of the agitator of the washing machine.

Since the vacuum pump 18 is now interconnected to the actuator 41, the output shaft of the motor 40 is driven in a direction to cause operation of the agitator of the washing machine.

Further, the vacuum regulator 16 controls the amount of vacuum being delivered to the actuator 20 to position the idler roller 53 in the proper position to cause the drive pulley 43 to drive the driven pulley 48 at the selected speed as selected by the knob 78′.

During the spin operation, the water level control 26 interconnects the vacuum line 18 to the line 24 of the vacuum regulator 22 so that the vacuum regulator 22 will cause the pulley 48 to be driven at the proper speed as selected by the control knob 77, the switch 43 being closed because during the spin operation, the ports 32 and 33 are bridged by blister means 36.

Thus, the output shaft of the motor 40 is driven in the proper direction to drive the pulley 48 to cause the transmission means 42 to spin the washing compartment of the washing machine.

The regulator 22, functioning in the same manner as the regulator 16, is adapted to maintain the vacuum signal being sent to the actuator 20 at the proper magnitude so that the same will hold the idler roll 53 in the proper position for the speed selected by the control knob 77.

In particular, should the vacuum signal being directed by chamber 21 to the port 14 in the reading head 11 exceed that selected by the control knob 77, the increased vacuum in the chamber 21 will pull downwardly on the diaphragm 64 in the manner illustrated in FIGURE 5 to cause the cover member 71 to be forced downwardly in opposition to the force of the compression spring 72 so that the same uncovers the vent port 73 in the diaphragm 64 to permit air to seep in to the chamber 21 and reduce the vacuum thereof until the diaphragm 64 again assumes the position as illustrated in FIGURE 5.

Should the degree of vacuum 21 in the chamber 21 not be at the magnitude set by the control knob 77, the force of the compression spring 72 and the vacuum condition in the chamber 21 moves the diaphragm 64 upwardly in opposition to the force of the compression spring 74 whereby the end 69 of the tube 68 is uncovered so that the chamber 21 will be interconnected to the vacuum pump 18 and be further evacuated until the diaphragm 64 assumes the position illustrated in FIGURE 5.

Thus, it can be seen that the regulators 16 and 22 are adapted to maintain the vacuum condition imposed on the bellows 20 at the desired magnitude so that the bellows 20 will hold the idler roll 53 in any position between and including its maximum and minimum speed positions to control the speed of the washing compartment and/or agitator of the washing machine.

If during the spinning of the washing compartment, an unbalanced condition should exist therein to cause the spinning washing compartment to spin off center and, thus, cause too great of a vibration in the frame means 82, it can be seen that the valve means 80 will reduce the vacuum condition in the bellows 20 to cause the idler roller 53 to move in a clockwise direction and, thus, reduce the speed of the driven pulley 48 as the valve member 84 will be progressively opened and closed in proportion to the vibrations set up in the frame means 82.

Therefore, it can be seen that the system 10 of this invention is readily adapted to provide infinite control of the agitation speed and spin speed of the washing machine 10 within the limits of the variable speed pulley 43 by means of a controlled vacuum signal being directed to the vacuum operated actuator 20.

Referring now to FIGURE 6, another embodiment of this invention is generally indicated by the reference numeral 90′ and parts thereof similar to the system 10 will be indicated by like reference numerals.

As illustrated in FIGURE 6, the belt means 47 passes around an idler roll 91 carried on the end 92 of the lever 93 pivotally mounted to the frame means by a pivot pin 94. The bellows 20 is interconnected to the lever 93 by interconnecting means 95.

When the bellows 20 is interconnected to the atmosphere, the force of the spring 46 acting to push the sheave 44 toward the fixed sheave 45 is strong enough to cause the belt means 47 to ride on the outer periphery of the pulley 43 so that the motor 40 is adapted to drive the driven pulley 48 at its maximum speed when the bellows 20 is interconnected to the atmosphere.

However, when a vacuum signal is directed to the bellows 20 in the manner previously described, the same causes clockwise movement of the idler roll 91 to cause the belt means 47 to decrease the pitch of the pulley 43 in accordance to the magnitude of the vacuum signal directed to the bellows 20 by the regulators 16 and 22 in the manner previously described whereby the speed of the driven pulley 48 will be correspondingly reduced.

Another speed control means of this invention is generally indicated by the reference numeral 96 in FIGURES 7 and 8 and parts thereof similar to the system 10 previously described are indicated by like reference numerals.

The motor 40 is mounted on a frame means 97 carrying a pivotally mounted lever 98 having one end 99 pivoted to the mounting means 97 by a pivot pin 100 and the other end 101 thereof interconnected to the movable wall 59 of the bellows 20.

The lever 98 engages the movable sheave 44 in the manner illustrated in FIGURE 7 and is normally urged in an out direction by a compression spring 102 disposed between the frame means 97 and the lever 98.

An idler roll 103 is provided and is carried on a lever 104 normally urged in a counterclockwise direction in FIGURE 8 by a compression spring 105 to tend to move the belt means 47 into the pulley 43 so that the same will drive the driven pulley 48 at its minimum speed when the bellows 20 is interconnected to the atmosphere.

The interior of the bellows 20 is adapted to be interconnected to either of the vacuum regulators 16 or 22 by a conduit means 106 and is adapted to be interconnected to the unbalance control valve 80 by a branch conduit means 107.

Thus, when a vacuum signal is directed to the bellows construction 20, the movable wall 59 is moved upwardly in FIGURE 7 to cause the lever 98 to drive the variable pitch sheave 44 toward the fixed sheave 45 and, thus, increase the pitch of the pulley 43 in proportion to the vacuum signal directed to the bellows 20 in opposition to the force of the compression springs 102 and 105 whereby the driven pulley 48 will be driven at an increased speed determined by the regulators 16 and 22.

Another embodiment of this invention is generally indicated by the reference numeral 108 in FIGURE 9 and parts thereof similar to the system 10 are indicated by like reference numerals.

As illustrated in FIGURE 9, the motor 40 is carried by a frame means 109 movable relative to a fixed frame means 110 within the limits of shoulders 111 and 112 thereof.

A lever 113 is pivotally mounted to the frame 109 by a pivot pin 114 and engages the movable sheave 44 of the pulley 43, the lever 113 being interconnected to the movable wall 59 of the bellows 20 while the fixed wall 60 of the bellows 20 is secured to the movable frame means 109.

A tension spring 115 is interconnected to the motor 40 and the fixed frame means 110 to normally move the motor 40 away from the driven pulley 48 so as to cause the belt means 47 to separate the sheaves 44 and 45 so that the motor 40 will normally drive the pulley 43 at its minimum speed when the bellows 20 is interconnected to the atmosphere.

However, when the interior of the bellows 20 is interconnected to one of the vacuum regulators 16 and 22 by the conduit means 116 in the manner previously described, the movable wall 59 of the bellows 20 is drawn upwardly to force the sheave 44 toward the sheave 45 and cause the frame means 109 to move to the left in FIGURE 9 so that the pitch of the pulley 43 will be increased to drive the driven pulley 48 at an increased speed as determined by the magnitude of the vacuum signal being directed to the bellows 20.

Therefore, it can be seen that this invention provides many embodiments wherein a variable speed means can be pneumatically controlled in response to the magnitude of a vacuum signal being directed to a vacuum actuator in a unique and novel manner.

While the form of the invention now preferred has been disclosed as required by the statutes, other forms may be used, all coming within the scope of the claims which follow.

What is claimed is:

1. A machine having a movable part, variable speed means for moving said part, pneumatically operated actuator means for controlling said speed means in response to a pneumatic signal directed to said actuator means, a source of pneumatic fluid, and control means for controlling the magnitude of said signal to select the speed of movement of said part, said control means including a timer movable program member that is adapted to automatically interconnect said source to said actuator means at a predetermined time period in the timed movement of said program member to provide said pneumatic signal to said actuator means, said control means including pre-settable selector means for automatically changing the magnitude of said pneumatic signal provided for said actuator means by said program member to predetermine the degree of actuation of said actuator means, and, thus, the speed of said movable part.

2. A machine as set forth in claim 1 wherein said control means infinitely selects said speed between the limits of said variable speed means.

3. In combination, a variable speed means, pneumatically operated actuator means for controlling said speed means in response to a pneumatic signal directed to said actuator means, a source of pneumatic fluid, and control means for changing said signal to select the speed of said variable speed means, said control means including a timer movable program member that is adapted to automatically interconnect said source to said actuator means at a predetermined time period in the timed movement of said program member to provide said pneumatic signal to said actuator means, said control means including pre-settable selector means for automatically changing said pneumatic signal provided for said actuator means by said program member to predetermine the degree of actuation of said actuator means and, thus, the speed of said variable speed means.

4. A combination as set forth in claim 3 wherein said actuator means is actuated in response to a vacuum signal.

5. A combination as set forth in claim 4 wherein said presettable means of said control means includes a vacuum regulator.

6. A combination as set forth in claim 3 wherein said control means is manually operated.

7. In combination, a motor driven drive pulley having a variable pitch sheave, a driven pulley, a belt means around said pulleys, pneumatically operated actuator means for changing the tension on said belt means in response to a pneumatic signal directed to said actuator means whereby the pitch of said drive pulley will be changed to vary the speed of said driven pulley, a source of pneumatic fluid, and control means for changing said signal to select the speed of said driven pulley, said control means including a timer movable program member that is adapted to automatically interconnect said source to said actuator means at a predetermined time period in the timed movement of said program member to provide said pneumatic signal to said actuator means, said control means including pre-settable selector means for automatically changing said pneumatic signal provided for said actuator means by said program member to predetermine the degree of actuation of said actuator means and, thus, the speed of said driven pulley.

8. A combination as set forth in claim 7 wherein an idler roller is in engagement with said belt means, a lever carrying said roller, spring means tending to maintain said lever in a position to cause said belt means to hold said drive pulley in its minimum pitch for driving said driven pulley at minimum speed, said actuator means being interconnected to said lever to move said lever in opposition to said spring means to increase said pitch as said signal is directed to said actuator means.

9. A combination as set forth in claim 7 wherein an idler roller is in engagement with said belt means, a lever carrying said roller, spring means tending to maintain said lever in a position to cause said belt means to hold said drive pulley in its maximum pitch for driving said driven pulley at maximum speed, said actuator means being interconnected to said lever to move said lever in opposition to said spring means to decrease said pitch as said signal is directed to said actuator means.

10. A combination as set forth in claim 7 wherein a lever engages said variable pitch sheave, spring means tending to hold said lever in a position to cause said belt means to hold said drive pulley in its minimum pitch for driving said driven pulley at minimum speed, said actuator means being interconnected to said lever to move said lever in opposition to said spring means to increase said pitch as said signal is directed to said actuator means.

11. A combination as set forth in claim 7 wherein said motor driven drive pulley is movable toward and away from said driven pulley, a lever engaging said variable pitch sheave, spring means tending to hold said drive pulley away from said driven pulley to cause said belt means to hold said drive pulley in its minimum pitch for driving said driven pulley at minimum speed, said actuator means being interconnected to said lever to move said lever in opposition to said spring means to move said drive pulley toward said driven pulley to increase said pitch as said signal is directed to said actuator means.

(References on following page)

References Cited

UNITED STATES PATENTS

| | | | |
|---|---|---|---|
| 2,130,995 | 9/1938 | Henny | 74—230.17 X |
| 2,585,732 | 2/1952 | Braman | 74—230.17 X |
| 2,625,835 | 1/1953 | Marek | 74—472 |
| 2,731,849 | 1/1956 | Rockwood et al. | 74—472 |
| 2,742,794 | 4/1956 | Vogelsang | 74—230.17 |
| 2,754,691 | 7/1956 | May | 74—472 |
| 2,823,872 | 2/1958 | Dourdeville | 74—472 X |
| 3,146,633 | 9/1964 | Schmitter et al. | 74—472 |
| 3,177,898 | 4/1965 | Scott et al. | 91—39 X |
| 3,195,368 | 7/1965 | Boudewijn | 74—230.17 X |
| 3,216,325 | 11/1965 | Couffer et al. | 91—37 X |
| 3,216,326 | 11/1965 | Rice et al. | 91—37 X |
| 3,233,629 | 2/1966 | Beck | 137—624.18 |

FOREIGN PATENTS

| | | |
|---|---|---|
| 8,451 | 7/1907 | Great Britain. |

FRED C. MATTERN, Jr., *Primary Examiner.*

DAVID J. WILLIAMOWSKY, *Examiner.*

J. A. WONG, *Assistant Examiner.*